April 22, 1958     H. L. SHAW ET AL     2,831,709
SWING JOINT PIPE COUPLING
Filed Sept. 27, 1954     2 Sheets-Sheet 1
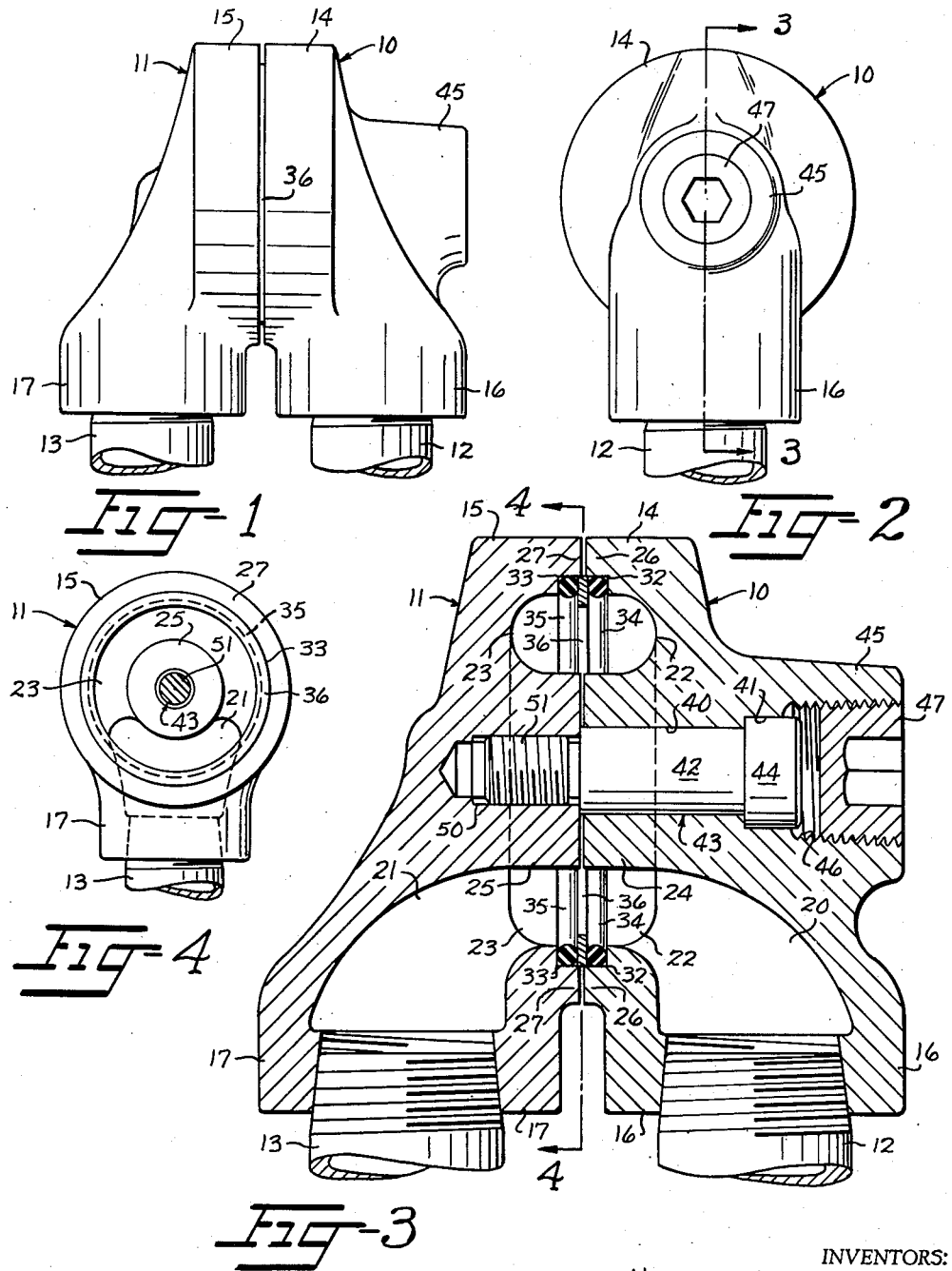
INVENTORS:
HARMON L. SHAW
and EDWIN C. SHAW
BY Eaton & Bell
ATTORNEYS.

April 22, 1958 H. L. SHAW ET AL 2,831,709
SWING JOINT PIPE COUPLING
Filed Sept. 27, 1954 2 Sheets-Sheet 2
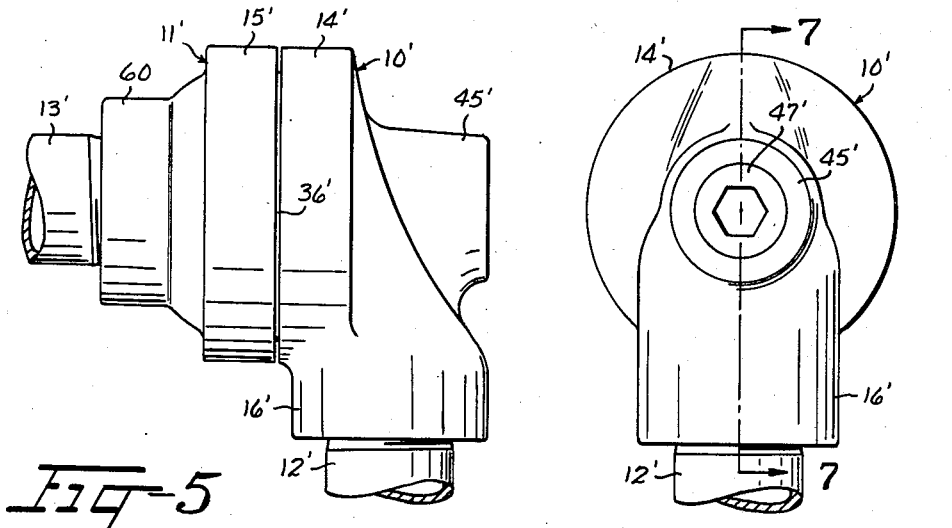
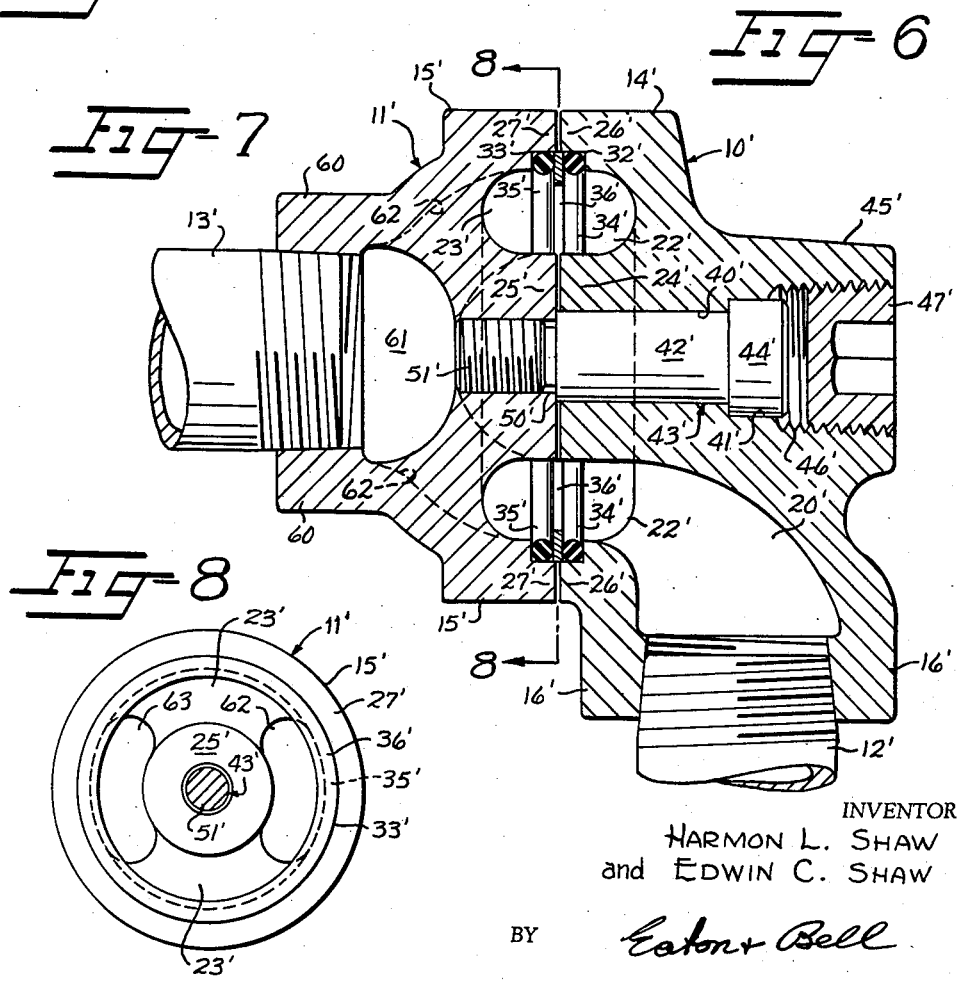
INVENTORS:
HARMON L. SHAW
and EDWIN C. SHAW
BY Eaton & Bell
ATTORNEYS.

United States Patent Office 2,831,709
Patented Apr. 22, 1958

2,831,709

SWING JOINT PIPE COUPLING

Harmon L. Shaw and Edwin C. Shaw, Charlotte, N. C., assignors to Perfecting Service Company, Charlotte, N. C., a corporation of North Carolina Application September 27, 1954, Serial No. 458,358

9 Claims. (Cl. 285—185)

This invention relates to pipe coupling devices and, more especially, to an improved swing joint or swivel joint for pivotally interconnecting adjacent ends of pipe sections or any other forms of conduits for communication therebetween and embodying novel means to prevent leakage of the liquid, air or other fluid being carried while permitting free relative pivotal movement between said pipe sections.

It is an object of this invention to provide a swing joint assembly of the character described comprising a pair of pivotally interconnected body members to which adjacent ends of pipe sections are connected and embodying a novel sealing means which is extremely simple to construct and has relatively few parts and wherein the body members may have freedom of relative movement without sacrificing the effectiveness of the sealing means, and which sealing means has a relatively long useful life without replacement of any of the parts thereof.

It is another object of this invention to provide a swing joint assembly comprising a pair of pivotally interconnected body members adapted for the connection of corresponding ends of pipe sections thereto. The proximal portions of the body members have respective annular grooves therein in which resilient rings are positioned, whose proximal surfaces snugly engage a smooth, thin and incompressible floating ring having an extremely low coefficient of friction. The incompressible floating ring is partially loosely disposed in both annular grooves. Passageways establish communication between the annular grooves and the respective pipe sections whereby the floating ring and the annular rings form a leak-proof connection between the two body members which permits free pivotal movement between the body members.

Some of the objects of the invention having been stated, other objects will appear as the description proceeds when taken in connection with the accompanying drawings, in which—

Figure 1 is a side elevation of one form of the improved swing joint assembly, showing the ends of two pipe sections connected thereto;

Figure 2 is an end elevation of the swing joint assembly looking at the right-hand side of Figure 1;

Figure 3 is an enlarged axial sectional view taken along line 3—3 in Figure 2;

Figure 4 is a transverse sectional view, on a reduced scale, taken along line 4—4 in Figure 3;

Figure 5 is a side elevation of another form of the improved swing joint assembly, showing adjacent ends of pipe sections connected thereto;

Figure 6 is an end view of the second form of swing joint assembly looking at the right-hand side of Figure 5;

Figure 7 is an enlarged axial sectional view taken along line 7—7 in Figure 6;

Figure 8 is a transverse sectional view, on a reduced scale, taken along line 8—8 in Figure 7.

Referring more specifically to the drawings, the form of swing joint assembly shown in Figures 1 to 4, inclusive, comprises a pair of mating body members or fittings broadly designated at 10, 11 which are adapted for the connection of respective pipe sections or conduits 12, 13 thereto. Although the fluid being carried may flow in either direction, for convenience, the pipes 12, 13 may be respectively termed as inlet and outlet pipes. The body members 10, 11 may be of any convenient shape and, in this instance, they include respective substantially circular, proximate or complementary axial end portions 14, 15 provided with respective enlarged substantially radially projecting portions 16, 17 having means for connecting the respective pipes 12, 13 thereto for communication with respective inlet and outlet passageways or channels 20, 21 formed in the projections 16, 17. Thus, the pipes 12, 13 extend substantially radially of the axis of the body members 10, 11.

The pipes or pipe sections 12, 13 may be connected to the body members 10, 11 by any suitable means, such as by being threaded into the respective portions 16, 17 as shown in Figure 3, or the proximal ends of the portions 16, 17 and the pipe sections 12, 13 may be suitably flanged and bolted or riveted together, as desired. The mating faces of the body members 10, 11 have coinciding substantially circular fluid passageways or grooves 22, 23 therein defining substantially circular bosses or hub portions 24, 25 in the central portions of the respective body members 10, 11 and substantially circular outer flange, lip or ridge portions 26, 27.

It will be noted that the passageways 20, 21 in the radially projecting portions 16, 17 of the body members 10, 11 communicate at their outer ends with the respective pipe sections 12, 13 and then curve inwardly and toward each other, communicating with the respective annular fluid passageways or grooves 22, 23 adjacent one side portion thereof. The proximal faces of the outer lip or ridge portions 26, 27 are provided with respective annular grooves 32, 33 which should be of substantially the same diameter and which preferably communicate with the annular passageways 22, 23 and serve as seats for respective circular or annular sealing elements 34, 35 in the form of O-rings made from a resilient material, such as rubber or neoprene or their equivalent, leather or the like. The O-rings 34, 35 are also preferably circular in cross-section and the depth of the respective grooves 32, 33 is necessarily greater than the cross-sectional diameter of the respective O-rings 34, 35.

The O-rings 34, 35 cooperate with a floating ring 36 in forming the nucleus of the improved sealing means between the mating fittings or body members 10, 11. The floating ring 36 may also be termed a race ring and is made from an incompressible or rigid material having an extremely low coefficient of friction and is positioned between and contacted by the proximal surfaces of the resilient O-rings 34, 35. Of course, the external diameter of the floating ring 36 should be less than the diameter of either of the grooves 32, 33 and should be of such thickness that it is disposed partially in both of said grooves 32 and 33 and spans the distance between the proximal surfaces of the portions 14, 15 of the head members 10, 11.

Also, the thickness of the floating ring 36 should be such as to at least slightly compress the resilient O-rings 34, 35 against the axially opposed surfaces of the grooves 32, 33 provided therefor in the body members 10, 11.

Now, there are various types of materials each having a low coefficient of friction, which may be used to serve the capacity of the floating ring 36. However, most materials are unsatisfactory when used for the purpose intended because of the fact that rubber or its equivalent will adhere to such materials. A very satisfactory material from which the floating ring 36 may be made is a product known as Teflon manufactured by E. I. DuPont DeNemours and Company, Inc. Teflon is a tetrafluoroethylene resin processed in the form of a white granular powder of small particles size from which parts may be molded or extruded by the application of techniques of powder metallurgy in which the Teflon molding powder is pressed into forms under controlled high heat. The Teflon molding powder may be pressed into the form of the floating ring 36 or the floating ring 36 may be fabricated from sheet or rod stock originally formed by the above process. The resultant product repels chemical attack, withstands heat, will not absorb moisture and very few elements will stick or adhere to it. To our knowledge, the only elements which will adhere to the ring 36 constructed for Teflon is chlorine trifluoride, molten alkali metals and hot fluorine.

Thus, opposed surfaces of the floating ring 36 serve as bearing surfaces or races against which the compressed O-rings 34, 35 may rotate without "galling" or sticking thereto and, of course, since the metal or other material from which the body members 10, 11 are made generally has a relatively high coefficient of friction as compared to that of the floating ring 36, the O-rings 34, 35 would remain in fixed relationship to the respective body members 10, 11. It is apparent that the O-rings 34, 35 are under compression in the grooves 32, 33 so the outer peripheral walls of the grooves 32, 33 are tightly engaged by the respective O-rings 34, 35, thus providing an effective and simple seal to prevent fluid or other matter from escaping from within the circular passageways 22, 23 outwardly between the proximal surfaces of the ridge portions 26, 27 of the body members 10, 11.

In order to pivotally interconnect the head members 10, 11, in such a manner as to insure that the fluid cannot escape at the pivotal connection therebetween, the first body member 10 has an axial bore 40 therethrough whose end opposite from the hub portion 24 is provided with a counterbore 41. A shaft in the form of a stripper bolt 43 is fixed to the second body member 11 for supporting the first body member. In this instance, the body portion 42 of the stripper bolt or shoulder screw, broadly designated at 43, slidably fits in the bore 40 and this stripper bolt 43 has a circular head 44 which slidably fits in the counterbore 41. The outer end of the circular portion 14 of the body member or fitting 10 preferably has a projection 45 thereon which is provided with an internally threaded bore 46 communicating with the counterbore 41 and in which a plug 47 is threadably secured. The wall of the internally threaded bore 46 and the wall of the plug 47 are preferably tapered to insure a tight, leak-proof seal therebetween and whereby the fitting or body member 10 may rotate on the body portion 40 and the head portion 41 of the shoulder screw or stripper bolt 43.

The second head member or fitting 11 has an internally threaded bore 50 therein in which a reduced threaded portion 51 of the shoulder screw or stripper bolt 43 is threadably embedded and whereby the shoulder formed at the junctures of the portions 42 and 51 of the stripper bolt or shoulder screw 43 bears against the inner surface of the hub portion 25 of the second body member 11. It will be noted that the length of the body portion 42 of the stripper bolt or shoulder screw 43 is slightly greater than the depth or length of the bore 40 in the hub portion 24 of the first body member 10 to thereby permit freedom of movement between the two body members 10, 11 while providing a minimum of space therebetween.

Although the space between the proximal surfaces of the hub portions 24, 25 and ridge or lip portions 26, 27 of the respective body members 10, 11 may vary more or less, as desired, it is preferable that a clearance of approximately four one-thousandths of an inch be provided between the proximal surfaces of the body members 10, 11. It is apparent that the length of the body 42 of the stripper bolt 43 relative to the length of the bore 40 should be such that the O-rings 34, 35 are compressed against the axially opposed surfaces of floating ring 36 when the head members 10, 11 are assembled.

It is thus seen that the head members 10, 11 may rotate in either direction each relative to the other as fluid is passed, say, from the pipe section 12, through the passageway 20, through the annular or circular passageways 22, 23, through the outlet passageway 21 and through the pipe section 13 and wherein a leak-proof seal is provided between the head members 10, 11 which is simply constructed, has a relatively long useful life and wherein a minimum of frictional resistance to rotation is present between the body members 10, 11.

*Modified form of swing joint pipe coupling*

The form of swivel or swing joint assembly shown in Figures 1, 2, 3 and 4 is particularly provided for connecting adjacent pipe sections which will extend in the same general planes or which will extend generally radially of the axis of the body members 10, 11. Now, referring to Figures 5, 6, 7 and 8, there is shown a modified form of the swing joint assembly wherein the inlet and outlet pipe sections or conduits extend in substantially right angular relationship; that is, one of the pipe sections extends radially of the axis of the head members and the other extends substantially axially from the head members. In this instance, the swing joint assembly shown in Figures 5, 6, 7 and 8 is quite similar to the swing joint assembly shown in Figures 1, 2, 3, and 4.

As a matter of fact, the first head member in the form of the invention shown in Figures 5, 6, 7 and 8 may be of identically the same construction as that of the first head member shown in Figures 1, 2, 3 and 4. Therefore, those elements shown in Figures 5, 6, 7 and 8 which are identical to or substantially the same as the elements shown in Figures 1, 2, 3 and 4 will bear the same reference characters with the prime notation added, in order to avoid repetitive description, and only those elements associated with the second head member 11' in Figures 5, 6, 7 and 8 which differ from the second head member 11 shown in Figures 1, 2, 3 and 4 will be described in detail.

It will be noted in Figures 5 and 7 that, instead of the second head member 11' being provided with a substantially radially projecting portion such as is indicated at 17 in Figures 1 and 3, the substantially circular portion 15' of the second head member 11' in Figures 5 and 7 has an axial projection or extension 60 integral therewith which is provided with a chamber 61 therein for communication with the outlet pipe section 13'. Here again, the pipe sections 12' and 13' may be connected to the respective projections 16, 60 of the respective body members 10', 11' in any suitable manner, as by being threaded thereinto as shown in Figure 7 or by providing complementary sets of flanges on the pipe sections 12', 13' and the projections 16', 60 and suitably securing said flanges together as by bolts or rivets, as desired.

It will be noted in Figure 7 that the outlet pipe section 13' communicates with the chamber 61 and, although a single passageway may be provided for establishing communication between the chamber 61 and the annular or circular fluid passageway 23', it will be observed in Figure 8 that there are two curved passageways or branch passageways 62, 63 provided which establish communication between substantially diametrically opposed portions of the substantially circular fluid passageway 23' and the chamber 61. Although the body members 10', 11' are shown as though being provided with projections 16', 45', 60 thereon and are also shown as being provided with substantially circular proximate portions 14', 15' thereon it is apparent that such configuration of the body members 10', 11' is merely desirable from the standpoint of savings in weight, material and compactness of the swing joint assemblies and these head members 10', 11' as well as the head members 10, 11 may be in the form of substantially rectangular blocks or cubes, if so desired, or of any other desired shape without departing from the spirit of the invention.

The annular passageways 22, 23 and 22', 23' are provided in the respective swing joint assemblies, in addition to the respective sets of grooves 32, 33 and 32', 33' to insure that the capacity of the swing joint assemblies is sufficient to accommodate the fluid directed therethrough by the respective pipe sections 12, 13 and 12', 13'. However, there are instances in which the annular passageways 22, 23 and 22', 23' may be omitted and the fluid would then pass through the grooves 32, 33 or 32' 33', as the case may be, in its course between the respective sets of auxiliary passageways 20, 21 or 20', 21'.

It is also contemplated that although the grooves 32, 33 and 32', 33' are shown in the drawings as though communicating directly with the respective annular or circular fluid passageways 22, 23 and 22', 23', the grooves 32, 33 and 32', 33' may be of a substantially greater internal diameter than the large diameter of the corresponding circular fluid passageways 22, 23 and 22', 23'. In this instance, the grooves for the O-rings 34, 35 and 34', 35' would be of such radial width as to loosely accommodate the respective floating rings 36, 36' and the resultant seals would be substantially as efficient and as easily constructed as the particular structures illustrated in the drawings without departing from the spirit of the invention.

It is further contemplated that the race ring 36 may be fixed in either groove 32 or 33 (in which case the corresponding O-ring 34 or 35 could be omitted). Of course, the race ring 36 would then be loose in the other groove and the corresponding O-ring would then bear against that end of the race ring which is free or loose in the corresponding groove.

It is thus seen that we have provided simple and efficient swing joint assemblies for pivotally interconnecting adjacent ends of pipe or conduit sections wherein the proximal faces of the body members thereof are provided with circular communicating annular passageways and are also provided with complementary grooves in which resilient O-rings are positioned and whose proximal surfaces engage a smooth incompressible floating ring having a low coefficient of friction as compared to that of the O-rings and which floating ring is partially disposed in the complementary grooves and also spans the distance therebetween and, thus, the O-rings and floating ring cooperate to form a simple and leak-proof seal between the body members which permits freedom of rotational movement therebetween.

In the drawings and specification there have been set forth preferred embodiments of the invention and, although specific terms are employed, they are used in a generic and descriptive sense only, and not for purposes of limitation, the scope of the invention being defined in the claims.

We claim:

1. An improved swing joint assembly for communicatively and pivotally interconnecting adjacent ends of pipe sections comprising first and second body members, means pivotally interconnecting the first and second body members in closely spaced relationship, said body members having substantially circular passageways in the proximal faces thereof, said first and second body members also having respective first and second annular grooves in the proximal faces thereof, said grooves openly communicating throughout their axial depth with the respective circular passageways first and second resilient O-rings disposed in the respective first and second annular grooves, a floating ring made from an incompressible material having an extremely low coefficient of friction disposed between the proximal surfaces of said O-rings and being of a greater thickness than the distance between the proximal faces of said body members, said body members having respective auxiliary passageways therein communicating with the respective substantially circular passageways, and means for connecting corresponding ends of the pipe sections to the respective body members for communication with the respective auxiliary passageways.

2. An improved swing joint comprising first and second body members, means pivotally connecting the first body member to the second body member with the proximal faces of the first and second body members being disposed in closely spaced relationship, means for connecting first and second pipe sections to the first and second body members at points remote from the proximal surfaces thereof, the proximal surfaces of said body members having substantially coinciding substantially circular first and second grooves therein, said body members each having at least one auxiliary passageway connecting the corresponding pipe section with the corresponding circular groove, first and second resilient O-rings disposed in the respective first and second grooves, a floating ring having an external diameter less than that of the internal diameter of said grooves and disposed between the O-rings, and said floating ring being of an axial thickness greater than the distance between the proximal surfaces of the first and second body members and having a low coefficient of friction relative to that of the O-rings whereby said O-rings may rotate with the corresponding body members relative to the intervening floating ring to provide a leak-proof joint between the first and second body members.

3. A structure according to claim 2 wherein said floating ring is molded from tetrafluoroethylene resin.

4. An improved swing joint for connecting corresponding ends of adjacent pipe sections comprising first and second body members having substantially flat mating surfaces thereon, means pivotally interconnecting said first and second body members and maintaining the proximal surfaces thereof in closely spaced relationship, means for connecting the pipe sections to the first and second body members in off-set substantially right-angular relationship to the mating proximal surfaces thereof, the first and second body members having respective first and second relatively large substantially concentric annular grooves in the proximal surfaces thereof, the outer portions of the walls of said relatively large annular grooves having relatively small annular grooves therein at the proximal surfaces of said body members and being of substantially greater external diameter than the external diameters of the relatively large annular grooves, an O-ring fitted in each of said relatively small annular grooves, means establishing communication between the pipe sections and the corresponding relatively large annular grooves in the proximal faces of the first and second body members, and a floating incompressible ring having a relatively low coefficient of friction disposed between and snugly engaging the proximal surfaces of the O-rings to thereby provide a seal to prevent fluid being carried from escaping between the proximal surfaces of the first and second body members while permitting free relative rotational movement therebetween.

5. An improved swing joint for connecting adjacent ends of first and second pipe sections comprising first and second body members having mating proximal faces thereon, a shaft secured to the second body member and projecting outwardly therefrom and on which the first body member is rotatably mounted, the proximal surfaces of said body members having respective relatively deep annular passageways therein, each of said members having an auxiliary passageway therein extending outwardly from a portion of the corresponding annular passageway, means connecting the first and second pipes to the first and second head members for communication with the respective auxiliary passageways, the proximal faces of the body members each having a second annular groove therein of substantially greater diameter than the annular passageways and being of substantially less depth axially of the first and second body members than that of the corresponding annular passageways, said grooves being open to the respective annular passageways a resilient O-ring disposed in each of said second annular grooves, a floating ring disposed between the proximal surfaces of said O-rings and loosely fitting partially in both of the second annular grooves in the proximal faces of the first and second head members, and said floating ring having a low coefficient of friction as compared to that of the O-rings and the head members.

6. A structure according to claim 5 wherein said floating ring is made from Teflon.

7. A structure according to claim 5 wherein said floating ring is made from a material formed by compressing small particles of granular tetrafluoroethylene resin under high heat to form a stock from which the floating ring is constructed.

8. A swing joint pipe coupling for connecting adjacent ends of pipe sections comprising first and second body members having respective first and second substantially circular passageways in the proximal faces thereof, the walls of the first and second passageways being recessed at the proximal faces of said first and second body members to form first and second annular grooves in the respective first and second body members, a resilient annular seal positioned in each annular groove, a floating ring having a substantially lower coefficient of friction than that of the seals disposed between said seals and being disposed partially within both the first and second grooves, said ring being sufficiently smaller in external diameter than said grooves to permit free rotational movement between the ring and the inner peripheries of the walls of the grooves, means to connect one end of a pipe section to each body member, means pivotally securing said body members together substantially concentric with said annular grooves, and said body members each having means therein establishing communication between its corresponding annular groove and the corresponding pipe section.

9. A structure according to claim 8 in which the floating ring is molded from tetrafluoroethylene resin.

References Cited in the file of this patent

UNITED STATES PATENTS

| | | |
|---|---|---|
| 318,790 | Patton | May 26, 1885 |
| 359,394 | Jones et al. | Mar. 15, 1887 |
| 871,577 | Dunkel | Nov. 19, 1907 |
| 1,123,839 | Bridges | Jan. 5, 1915 |
| 1,285,849 | Walling | Nov. 26, 1918 |
| 1,765,693 | Muend | June 24, 1930 |
| 2,494,598 | Waring | Jan. 17, 1950 |

FOREIGN PATENTS

| | | |
|---|---|---|
| 4,175 | Great Britain | 1883 |
| 491,483 | Germany | Feb. 14, 1930 |
| 534,439 | Great Britain | Mar. 6, 1941 |